(12) United States Patent
Pedersen (10) Patent No.: US 9,903,347 B2
(45) Date of Patent: Feb. 27, 2018

(54) WIND TURBINE GEARBOX

(71) Applicant: VINDG A/S, Lyngby (DK)

(72) Inventor: Troels Pedersen, Lyngby (DK)

(73) Assignee: VINDG A/S, Lyngby (DK)

( * ) Notice: Subject to any disclaimer, the term of this patent is extended or adjusted under 35 U.S.C. 154(b) by 163 days.

(21) Appl. No.: 14/414,733

(22) PCT Filed: Jul. 16, 2013

(86) PCT No.: PCT/EP2013/065036
§ 371 (c)(1),
(2) Date: Jan. 14, 2015

(87) PCT Pub. No.: WO2014/012947
PCT Pub. Date: Jan. 23, 2014

(65) Prior Publication Data
US 2015/0192110 A1    Jul. 9, 2015

(30) Foreign Application Priority Data

Jul. 16, 2012    (DK) .................................. 2012 00460

(51) Int. Cl.
*F16H 1/28*    (2006.01)
*F16H 1/48*    (2006.01)
(Continued)

(52) U.S. Cl.
CPC ............ *F03D 11/005* (2013.01); *F03D 15/00* (2016.05); *F03D 80/70* (2016.05); *F03D 80/80* (2016.05);
(Continued)

(58) Field of Classification Search
None
See application file for complete search history.

(56) References Cited

U.S. PATENT DOCUMENTS

| 2,209,120 | A | * | 7/1940 | Hoffman | ................... | F16H 1/48 |
| | | | | | | 475/347 |
| 2002/0449108 | | | 4/2002 | Hosle | | |

(Continued)

FOREIGN PATENT DOCUMENTS

| JP | 2004 239113 A | 8/2004 |
| JP | 2006144558 A | 6/2006 |
| JP | 2009250213 A | 10/2009 |

OTHER PUBLICATIONS

International Search Report dated Oct. 15, 2013 from corresponding International Application No. PCT/EP2013/065036; 3 pgs.

*Primary Examiner* — Robert A Siconolfi
*Assistant Examiner* — Ryan Dodd
(74) *Attorney, Agent, or Firm* — Maier & Maier, PLLC (57) ABSTRACT

The present invention relates to a gearbox for a wind turbine comprising: an input shaft portion adapted to be operatively connected to a wind turbine rotor shaft; and input hear wheel having teeth arranged around an outer or inner circumference of the wheel, and being attached to the input shaft portion such as to rotate with the input portion; one or more pinions including a pinion wheel arranged on a pinion shaft, the pinion wheel having teeth arranged to engage with the teeth of the input gear wheel, and the pinion shaft being rotatably mounted in a pinion support structure, wherein the input shaft portion is rotatably mounted with respect to the pinion support structure.

10 Claims, 4 Drawing Sheets

(51) Int. Cl.
    *F03D 11/00*     (2006.01)
    *F16H 1/22*     (2006.01)
    *F16H 1/26*     (2006.01)
    *F16H 57/021*     (2012.01)
    *F16H 57/025*     (2012.01)
    *F03D 80/70*     (2016.01)
    *F03D 15/00*     (2016.01)
    *F03D 80/80*     (2016.01)
    *F16H 57/02*     (2012.01)

(52) U.S. Cl.
    CPC ............... *F16H 1/227* (2013.01); *F16H 1/26* (2013.01); *F16H 1/2836* (2013.01); *F16H 1/48* (2013.01); *F16H 57/021* (2013.01); *F16H 57/025* (2013.01); *F05B 2260/40311* (2013.01); *F16H 2057/02078* (2013.01)

(56) References Cited

U.S. PATENT DOCUMENTS

| | | | | |
|---|---|---|---|---|
| 2004/0237683 A1* | 12/2004 | Mikhail | ................... | F03D 15/00 74/410 |
| 2008/0207389 A1* | 8/2008 | Fahrenbach | ............ | F03D 15/00 475/344 |
| 2010/0032961 A1 | 2/2010 | Numajiri | | |
| 2013/0029802 A1* | 1/2013 | Fox | ........................ | F16H 1/2836 475/344 |

* cited by examiner

WIND TURBINE GEARBOX

FIELD OF THE INVENTION

The present invention relates to a gearbox for use in a wind turbine as well as a wind turbine comprising the gearbox of the present invention.

BACKGROUND OF THE INVENTION

Many wind turbines use either a high ratio gearbox (e.g. 80:1) or none at all (1:1). The challenge for using no gearbox at all is the very low speed of the main axle or input shaft. Thus, to get a usable induction and production of electricity the generator needs to have a huge area of active magnets, and as many poles as possible together with many windings. In practice, the size of the generator is enormous.

On the other hand using a high ratio gearbox brings up the speed and minimizes the generator size. However, the cost of a high speed gearbox is loss of power during conversion, which accumulates to almost 1% for each stage. Using a three stage planetary gearbox means loss of 3% power before entering the generator. This lowers the profit of utilizing the turbine and emphasizes the need for cooling the gearbox properly during operation. Just as an example, having a generator with an efficiency of 97% and in the same drivetrain a gearbox of 97% gives a conversion efficiency of 94% which means 6% is lost in heat inside the transmission. Converting 3 MW means that 180 kW is lost as heat, and must be removed from the transmission to the ambience. This may be a challenge apart from representing a loss in economy.

In a direct drive solution 97% of efficiency may be achieved in the generator as well, and will leave out the losses of the gearbox transmission.

Many manufactures of wind turbines still use gearboxes in new designs, as this lowers size and weight of the generator. However, the gearbox may—apart from losing power during conversion—also be a challenge in other ways.

The rotor of the wind mill produces an extremely high torque during operation. Producing e.g. 3 MW with only 15 rpm rotor speed means that the torque entering a gearbox in the wind turbine reaches nearly 2 MNm, which is almost equivalent to the torque of 10,000 automotive engines put together. Thus, there is a need for rapid distribution or conversion to higher speed with lower torque in order to keep the wind turbine reasonable in size and weight.

Today both distribution of power and conversion to higher speed are ways seen in practice.

In WO2012156128 a widely used gearbox is shown, in which the torque is transformed using a single stage planetary gear, followed by two simple helical gear stages.

Using a planetary stage as input gear gives a natural distribution of the torque from rotor to several planetary wheels, that together help to convert the low speed input to a high speed output, which may be handled by the following helical gear stages.

Using a planetary gearbox is complicated even though it is a good means to distribute the high torque from the rotor. Planetary gears may be useful for securing that all planetary wheels carry the same load while avoiding overstressing one or more. In practice this calls for a high precision in the position and production of gearwheels and planetary carrier, as well as the housing of the gearbox. Having such restrictions in design and production increases the cost of the gearbox.

For the gearbox having a first planetary stage, the connection towards the rotor is very critical. In many gearboxes using planetary gears as a first stage, the input of the gear stage is the planet carrier. This is usually fixed to the housing of the gearbox rotationally using one or more bearings. Thus the connection towards e.g. a main axle transferring the power from the rotor of the wind turbine to the gearbox is very critical. The main axle is very typically fixed rotationally by one or two bearings, meaning that a stiff or non-flexible connection between the main axle and the gearbox results in over constraints. In the end any flexing of the main axle during operation e.g. during high winds produce unexpected loads of the planet carrier, and possible bendings, leading to unpredictable loads of the individual gearwheels. Consequently, the gearbox loose lifetime of operation or even breaks down.

Finally, the usage of multiple gearwheels in a planet stage may during certain conditions lead to oscillation between the gearwheels, depending on many factors such as stiffness and loads/speeds.

Clipper Wind (WO2012164501) suggest to split out the high torque from the rotor using 4 individual bull gears placed on the main shaft, each meshing with a pinion driving a second stage gearbox. Finally the second stage gearbox is connected to a generator converting the energy. As opposite of the planet gearbox the concept offers load distribution to four separate sub-systems early in the drivetrain. Depending on the control of each generator, the concept offers independent power control, which is expected to give lower interference and by that phenomenon such as oscillations and vibrations. At least such phenomenon may easily be controlled using the loading of generators to eliminate it.

In addition the concept offers much redundancy as the system is expected to be operational even though one of four systems sets out for one or another reason.

In many dimensions, the later example gives a high reliability and robustness. In addition, it gives a reasonable compact size, and freedom to adapt one or more embodiments for different input powers.

SUMMARY OF THE INVENTION

The present invention relates in a broad aspect to a gearbox for a wind turbine comprising an input shaft portion adapted to be operatively connected to a wind turbine rotor shaft, an input gear wheel having teeth arranged around an outer or inner circumference of the wheel, and being attached to the input shaft portion such as to rotate with the input shaft portion, one or more pinions including a pinion wheel arranged on a pinion shaft, the pinion wheel having teeth arranged to engage with the teeth of the input gear wheel, and the pinion shaft being rotatably mounted in a pinion support structure, wherein the input shaft portion is rotatably mounted with respect to the pinion support structure.

The effect of the composition of the gearbox is that if the rotor shaft bends, the support structure flexes with it. Thereby the pinion shafts also flex or move with it, so that the meshing of the pinions with the input gear wheel is maintained. This allows the pinion support structure to move with bending loads on the input shaft. This reduces the transmission of damaging loads to the gearbox.

In addition, the simple design e.g. using an annulus ring wheel as the input gear wheel and having pinions fixed to the support structure within the circumference of the annulus ring gear, eliminates partly the need for an out housing carrying reactive forces during load of the gearbox. Consequently, the reactive forces during load only need to be carried by the support structure, eliminating huge encapsulings carrying reactive forces from gear stages to fixation points for adaption to the nacelle. Thus, the present invention allows for much more compact design and better distribution and utilization of materials in general.

Further advantages can be seen in that the rigidness of the reference structure becomes less critical. Another advantage in using the input shaft as the structure for the gearbox is that an external structure carrying all forces is not necessary.

In another aspect, the present invention relates to a wind turbine comprising a reference structure, a rotor having a rotor hub and one or more rotor blades, a rotor shaft connected to the rotor hub, a gearbox having an input shaft portion adapted to be operatively connected to a wind turbine rotor shaft, an input gear wheel having teeth arranged around an outer or inner circumference of the wheel, and being attached to the input shaft portion such as to rotate with the input shaft portion, one or more pinions including a pinion wheel arranged on a pinion shaft, the pinion wheel having teeth arranged to engage with the teeth of the input gear wheel, and the pinion shaft being rotatably mounted in a pinion support structure, wherein the input shaft portion is rotatably mounted with respect to the pinion support structure, wherein the rotor shaft is rotatably mounted with respect to the reference structure.

Further objects will become apparent upon reading the present description and claims.

DESCRIPTION OF THE INVENTION

In a first aspect the present invention concerns a gearbox for a wind turbine comprising an input shaft portion adapted to be operatively connected to a wind turbine rotor shaft, an input gear wheel having teeth arranged around an outer or inner circumference of the wheel, and being attached to the input shaft portion such as to rotate with the input shaft portion, one or more pinions including a pinion wheel arranged on a pinion shaft, the pinion wheel having teeth arranged to engage with the teeth of the input gear wheel, and the pinion shaft being rotatably mounted in a pinion support structure, wherein the input shaft portion is rotatably mounted with respect to the pinion support structure.

The input shaft portion is a part of the rotor shaft of the wind turbine forming part of the gearbox. Thus, the input shaft may consist of at least a rotor shaft, an input shaft portion of the gearbox and an inner shaft supporting pinion structure.

This gearbox is suitable for use in connection with a wind turbine, which also includes a generator.

In one embodiment the pinion support structure (11) rotatably supports the input shaft and the pinion shaft(s).

In another embodiment the pinion support structure is flexibly mounted with respect to a reference structure. Such flexible solution may be selected from flexible elements such as elastic couplings or mechanisms allowing the pinion support structure to either move or rotate in one or more dimensions.

The skilled person knows that the flexible mounting may not limit the pinion support structure from rotating during operation of the wind turbine. Furthermore, even if the support structure is mounted to the input shaft, the support structure may not rotate when the rotor is rotating. Therefore, in a further embodiment the pinion support structure is locked or partly locked against turning around the input shaft. Partly locked is intended to mean that an adjustable mechanism may be used which allows for some rotation of the pinion support structure.

The reference structure may be a nacelle of the wind turbine, or a housing of the gearbox.

In a further embodiment, the input gear wheel is an annulus gear wheel. In another embodiment, the input gear wheel is a bull gear wheel. Any of the mentioned gear wheels may have involute gear teeth corrected in any way to optimize the meshing. Also, the gear wheels may have a helical toothing that increases contact ratio and limits noise during operation.

In a still further embodiment, the pinion support structure is fixed rotably with bearings, such as roller bearing elements, ball bearing elements, oil or grease, to the input shaft and allowing the pinion gear wheel to rotate.

In a further embodiment, the gearbox has two or more degrees of freedom in a connection between pinion support structure and the reference structure. For example, the gearbox may be provided with two or more degrees of freedom by providing a means for the gearbox to have freedom to move or rotate. Such means is selected from a rod or a bracket between the pinion support structure and a reference structure, wherein the rod or bracket is fixed to the pinion support structure and the reference structure in both ends in a flexible manner so as to allow for rotation. The skilled person knows that rotation of the rotor around the axis of the wind turbine shaft is not allowable. It must be understood that even though the pinion support structure may not rotate around this axis due to the flexible connection, the connection may possess properties that allows for minor repositioning of the pinion flexible structure during operation; this may include, for example, an actuator may be configured to rotate the pinion support structure and thereby adjust the connection. As such, the flexible connection may include flexible elements used as a connecting part including rubber or polymers. Further, the connection may include rigid parts being rotatably or slidable connected to the support structure and the reference structure.

In a still further embodiment, the input shaft and the pinion support structure is fixed rotationally in a contact bearing, such as a rolling element bearing or a ball bearing element.

In a further embodiment, the input shaft is fixed by a reference structure and allowed to rotate via one bearing. In a further embodiment, the input shaft is fixed by a reference structure and allowed to rotate via two bearings.

Typically, the bearing is a rolling element bearing. Alternatively, the bearing is a ball bearing element. In a further embodiment, the bearing is a friction bearing element, such as oil or grease.

Preferably, the pinion gear wheels have involute teeth, such as involute teeth and a helical shape. The number of the pinion gear wheels may be selected from 1-10. Typically, the number of the pinion gear wheels is 2. Alternatively, the number of the pinion gear wheels is 3 or 4. The size of the teeth may follow general rules for modulizing of a gearwheel. Thus the module of the teeth may be selected from Module 10-40. Typically, the module of the teeth may be selected from Module 16-30.

The reference structure may be any suitable structure that can be used as support for any element of the gearbox, and typically, the reference structure is a nacelle. Alternatively, the reference structure is a frame or housing of the gearbox.

The input gear wheel may be positioned relative to the bearings, such as the rolling element bearing or the ball bearing element, so that when one bearing is present the input gear wheel is aligned in axial direction with the bearing. Alternatively, when one bearing is present and the input gear wheel is placed inside the nacelle, the input gear wheel is placed axial away from the bearing. In a further embodiment when one bearing is present the input gear wheel is placed closer to the wind turbine rotor than the bearing.

The input gear wheel may be positioned relative to the bearings, such as the rolling element bearing or the ball bearing element, so that when two bearings are present, such as selected from rolling element bearings and ball bearing elements, the bearings are placed between the rotor or the wind turbine and the input gear wheel.

Alternatively, the input gear wheel may be positioned relative to the bearings, such as the rolling element bearing or the ball bearing element, so that when two bearings are present, such as selected from rolling element bearings and ball bearing elements, the bearings are placed on each side of the input gear wheel.

Furthermore, the input gear wheel may be positioned relative to the bearings, such as the rolling element bearing or the ball bearing element, so that when two bearings are present, such as selected from rolling element bearings and ball bearing elements, the bearings are placed after the input gear wheel.

In a further aspect, the present invention relates to a wind turbine comprising a reference structure, a rotor having a rotor hub and one or more rotor blades, a rotor shaft connected to the rotor hub, a gearbox according to the present invention and any one of the embodiments described herein, wherein the rotor shaft is rotatably mounted with respect to the reference structure.

The wind turbine comprises a generator, such as 1-10 generators, typically, 2, 3 or 4 generators, and the generator is operably connected to the gearbox output via the pinion shaft.

In an embodiment the reference structure is a nacelle. The reference structure may be composed of one or more parts.

In a further embodiment the generator is fixed to the reference structure, such as the nacelle. Typically, the generator is fixed to the reference structure with a partly flexible connection. The generator may also be fixed to the pinion support structure, in a flexible way such as rotatably or using rubberlike elements.

If the pinion shaft is connected directly to the generator, then only a single stage gearbox is present which allows for a smaller generator compared to a direct drive solution, and at the same time reduces the loss in the gear to about 1%, which is less compared to a 3-stage gearbox (about 3%).

Thus, in a further embodiment of the wind turbine, the pinion shaft is connected directly to the generator and only one gearbox is present.

The above embodiments should be seen as referring to any one of the aspects (such as 'gearbox', 'wind turbine', or 'gearbox for use') described herein as well as any one of the embodiments described herein unless it is specified that an embodiment relates to a certain aspect or aspects of the present invention.

All references, including publications, patent applications and patents, cited herein are hereby incorporated by reference to the same extent as if each reference was individually and specifically indicated to be incorporated by reference and was set forth in its entirety herein.

All headings and sub-headings are used herein for convenience only and should not be construed as limiting the invention in any way.

Any combination of the above-described elements in all possible variations thereof is encompassed by the invention unless otherwise indicated herein or otherwise clearly contradicted by context.

The terms "a" and "an" and "the" and similar referents as used in the context of describing the invention are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. Unless otherwise stated, all exact values provided herein are representative of corresponding approximate values (e.g., all exact exemplary values provided with respect to a particular factor or measurement can be considered to also pro-vide a corresponding approximate measurement, modified by "about," where appropriate).

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise indicated. No language in the specification should be construed as indicating any element is essential to the practice of the invention unless as much is explicitly stated.

The citation and incorporation of patent documents herein is done for convenience only and does not reflect any view of the validity, patentability and/or enforceability of such patent documents.

The description herein of any aspect or embodiment of the invention using terms such as "comprising", "having", "including" or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

This invention includes all modifications and equivalents of the subject matter recited in the aspects or claims presented herein to the maximum extent permitted by applicable law.

The present invention is further illustrated by the following examples which, however, are not to be construed as limiting the scope of protection. The features disclosed in the foregoing description and in the following examples may, both separately and in any combination thereof, be material for realizing the invention in diverse forms thereof.

DETAILED DESCRIPTION

Figure 1A:
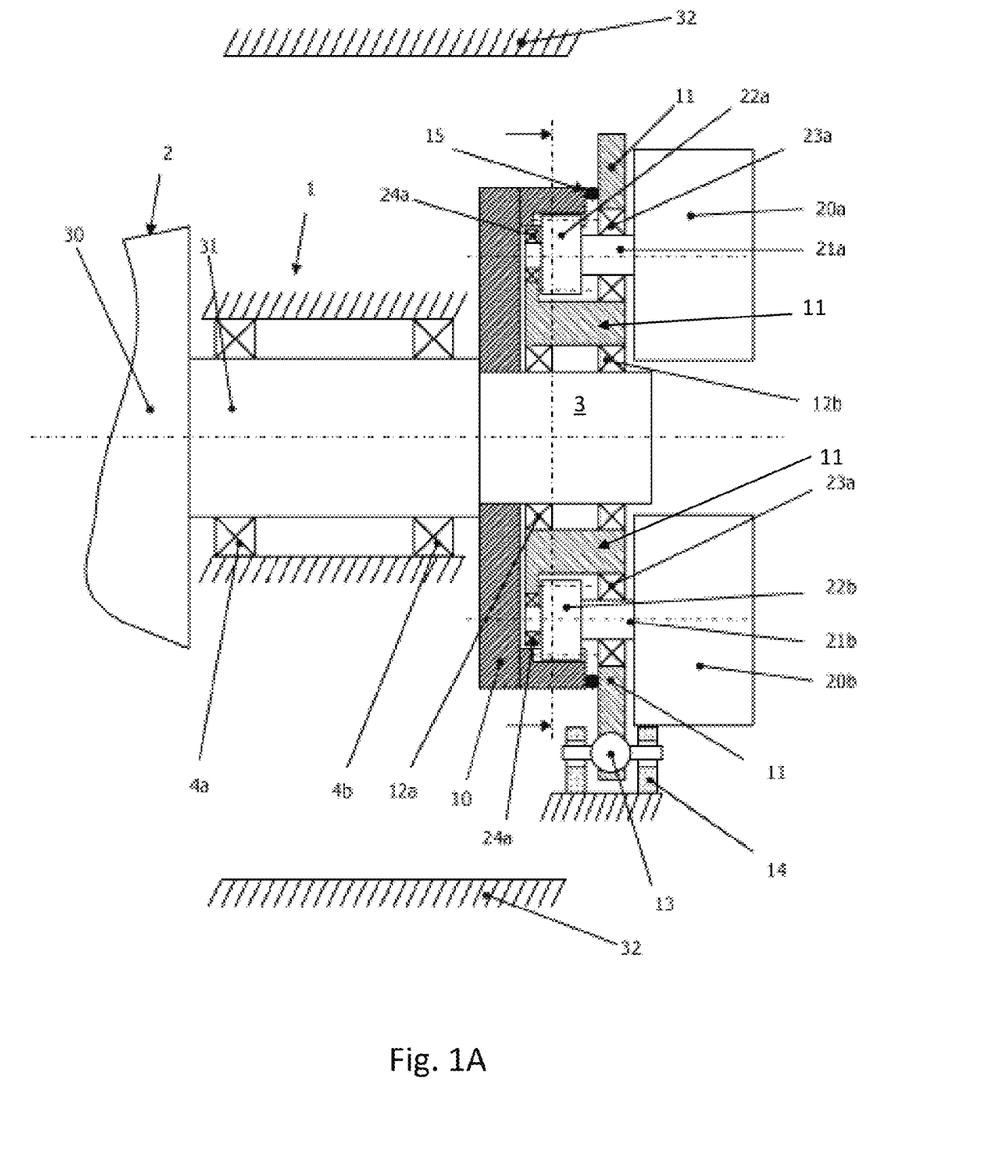
FIG. 1A shows a cross section of a gearbox in one embodiment of the present invention.

FIG. 1 shows one preferred embodiment of the invention. In FIG. 1A, the gearbox is seen in a cross section. The wind turbine comprises a reference structure, or main structure (1), inside the nacelle (32), which allows for rotational fixation of a rotating rotor (2) of the turbine. The rotational fixation of the rotor (2) includes a rotor hub (30), an input shaft (3) including a rotor shaft (31), and one or more bearings (4 a, 4 b). During operation the rotor (2) is rotated by the wind and the rotor transfers rotational movement to the input shaft (3), which rotates relatively to the main structure (1) of the wind turbine. The movement of the input shaft (3) works as the input for the gearbox.

An annulus ring gear (10) is attached to the main axle (3) in ways that secures that rotational movement and torque is transferred from the input shaft (3) to the annulus ring gear (10). The annulus ring gear (10) may be adapted in several ways including a bolted fixation or any other known mechanical way.

A pinion support structure (11) is fixated rotationally, e.g. so as to be rotatable but otherwise fixed, with respect to the input shaft (3). Either the support structure (11) is fixated directly onto the input shaft (3), preferably by one or more bearings (12 a, 12 b) or the support structure (11) is fixated by other means to the main structure (1). This may be done in several ways including using passive or active flexible elements between the support structure (11) and the main structure (1). Just to serve as an example the fixation structure may be held in the correct position e.g. coaxial to the input shaft (3) without the bearings (12 a, 12 b) but instead by using active flexible elements between the main structure (1) and the fixation structure (11). Such elements includes numerous hydraulic cylinders.

One or more generators (20 a, 20 b) are adapted to the support structure (11) so the pinion shaft (21 a, 21 b) is allowed to rotate relatively to the housing of the generator and the support structure (11). The pinion shaft (21 a, 21 b) is connected directly to the rotor of the generator. The pinion shaft (21 a, 21 b) is fixated rotationally to the support structure (11) using bearings (23 a, 23 b and 24 a, 24 b). It must be understood that the bearings (23 a, 23 b) versus (24 a, 24 b) may vary in size, type or principle.

Just to serve as an example, the bearings (23 a, 23 b) may be of a type allowing transferring forces axial with the pinion shaft (21 a, 21 b), whereas the bearings (24 a, 24 b) may be of another type only adapting forces in radial direction. Further, two types of bearings may differ from each other as one is a roller bearing type and the other is a ball bearing type.

The pinion shaft (21 a, 21 b) is connected to a pinion gearwheel (22 a, 22 b), that rotate with each other being connected to transfer torque or even being integral. Thus, the system does not comprise any other gearbox, and the maximum gear ratio that may be obtained is the maximum ratio in diameter between the annulus ring gear (10) and the pinion gearwheel (22 a, 22 b). For normal sizes and dimensions of gearwheel this means that the gearing ratio will end between 2:1 and 10:1.

As described in the introduction, many wind turbines use either a high ratio gearbox (e.g. 80:1) or none at all (1:1). The usage of only one step of gearing brings up the speed of the generator, which decreases the need for size of the generator, and with that enables easier handling and less usage of materials. Using a low gearing further decreases the number of stages needed to create the gearing, meaning less loss of energy during conversion. In fact, the losses may be reduced to only 1% during the simple one stage gearing.

As mentioned in the introduction, the simplicity may in many ways influence on the robustness and reliability of a transmission system. Using only one gearing—an annulus ring gear in combination with a pinion wheel connected directly to a generator combines less usage of gear stages with early distribution of forces. Redundancy is kept as one generator may be connected and driven while another one is out of order. Still the system is not a direct drive solution wherein the size of the generator becomes immense.

The gearwheel (22 a, 22 b) is meshing with the annulus ring gear (10). So that during movement of the rotor (2) rotational energy is transferred via the annulus ring gear to the pinion shaft (21 a, 21 b) and from there into the generator producing electric energy. During operation and production of electricity, a counter torque, that equals the torque transferred in the input shaft (3), will occur on the support structure (11) and the housing of the generators.

The counter torque that occurs on the generators may be adapted by a mechanical connection to the main structure (1) or by fixating the generators directly to support structure (11). In both cases the generator may be rotationally fixed with respect to the support structure (11) allowing for the generator to rotate with respect to the support structure (11).

The counter torque that occurs on the support structure (11) may be transferred to annulus ring gear (10) via a flexible coupling made in many different ways.

In one preferred embodiment, features on the support structure (11) allow for adaption of a flexible connection (13) as shown in FIG. 1A. This connection (13) includes a ball bearing with extensions to each side. The ball, which may be made of a high grade steel, is positioned in the support structure (11) allowing for limited rotation in all dimensions. Further the extensions are mating with slots in a bracket (14) connected or integral with the main structure (1).

A sealing component (15) forms together with sealed bearings (23 a, 23 b) and (12) a closed compartment allowing for a liquid lubrication to be held or collected during operation.

Figure 1B:
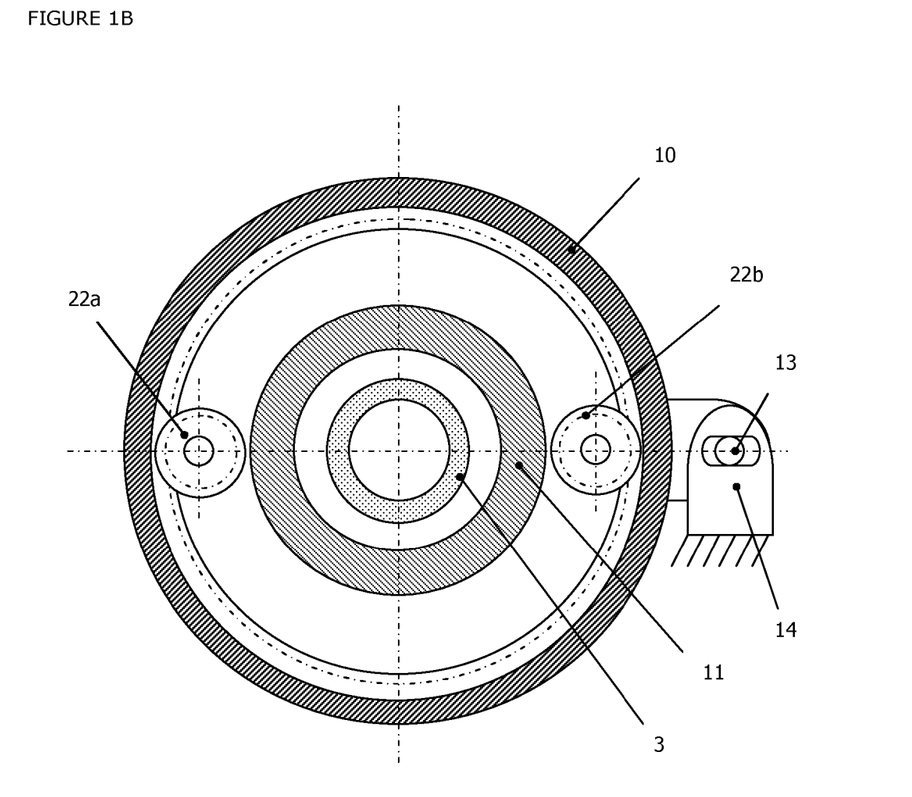
FIG. 1B shows the gearbox of FIG. 1A in a cross section along the line indicated by arrows in FIG. 1A.

FIG. 1B shows the gearbox in another section. The section is seen on FIG. 1A as well.

Figure 2:
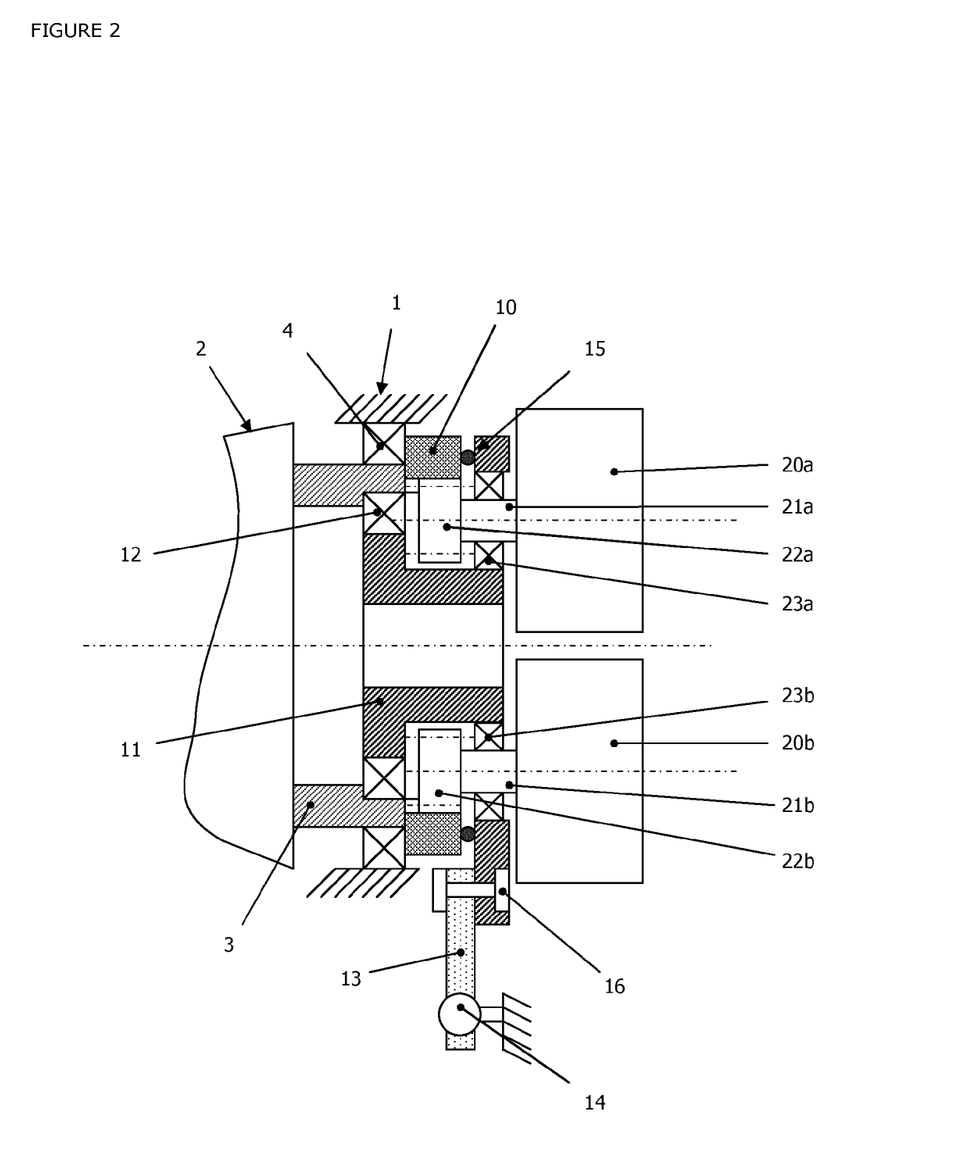
FIG. 2 shows a cross section of another gearbox in one embodiment of the present invention.

FIG. 2 shows another preferred embodiment of the invention. In FIG. 1 all fixations including rolling bearings comes in pairs, understood so that the input shaft, the fixation structure and the input shafts of the generators all are fixated by two bearings each. This may be necessary when using e.g. many types of bearings unable to adapt torques applied onto the inner race-way. Such bearings include simple ball bearings or simple roller bearings, and even friction bearings including hydrodynamic and hydrostatic bearings.

Though, some types or constellations of standard roller/ball bearings allows for adaption of torque applied to the inner race-way. Examples of this are four-contact-ball bearings, and recent integration of two tapered bearings. These bearings may be perceived as being one single bearing adapting both radial and axial forces together with torques applied to the inner race way.

In FIG. 2 an embodiment similar to the one in FIG. 1 is shown, but where all pairs of bearings are replaced with single bearings capable of adapting torques applied.

An input shaft (3) transfers rotational power from the rotor (2) to the input gear being an annulus ring gear (10). A single rolling bearing (4) allows for rotation of the input shaft (3), and the rotor (2), which are connected. Further the support structure (11) is adapted to the input shaft (3) by another single bearing (12).

The support structure (11) allows for rotation of the pinion wheels (22 a, 22 b), which may be integral with or connected to input shafts (21 a, 21 b) of generators (20 a, 20 b).

It must be understood that any combination of single bearings and pair bearings may be used for different variations between the embodiment shown in FIG. 1 and the one shown in FIG. 2. As an example, in one preferred embodiment, only the bearings (4) may make use of a single bearing solution, whereas the remaining bearings all are formed by two bearings positioned with a distance to form a rigid design.

The support structure (11) in FIG. 2 is further connected flexible to the reference structure (1) by the use of a rod element (13) adapted rotatably to the support structure (11), using a pin (16).

The rod element (13) is further fixated by a ball bearing (14) in the other end, allowing for the support structure to move in at least two directions but being limited in rotation around the axis parallel to the input shaft (3).

Figure 3:
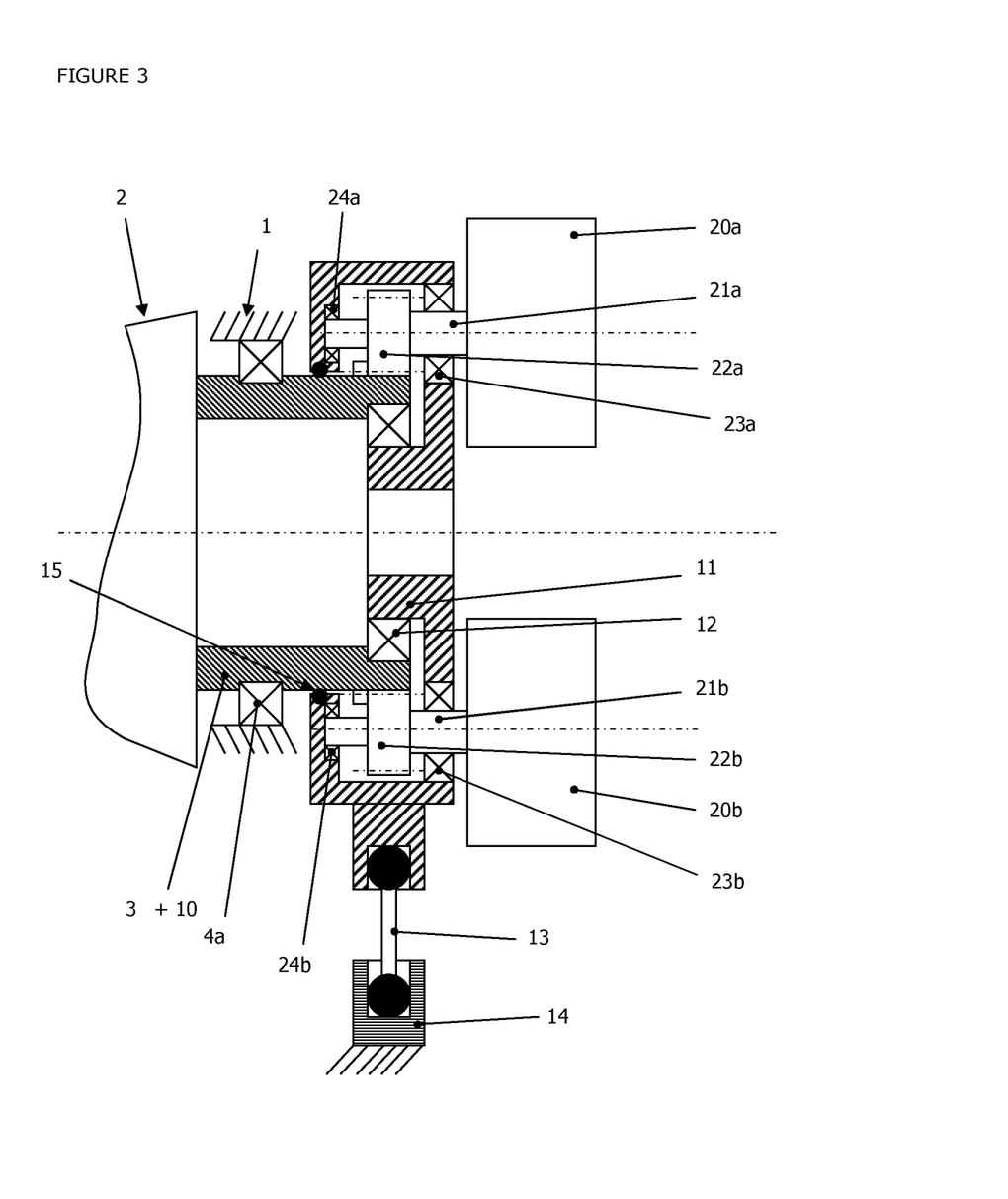
FIG. 3 shows a cross section of another gearbox in one embodiment of the present invention.

FIG. 3 shows yet another preferred embodiment of the invention. The embodiment is very similar to that of FIG. 2, though the input gear is formed by a bull gear integral with input shaft (3+10). In addition, the support structure (11) is extended to support the input axle bearings on each side of the pinion gear wheels. By that the support structure forms a housing of the gearbox allowing for a lubricating oil to be held. A sealing (15) seals, together with the sealing of bearings, the lubrication chamber.

The support structure (11) is connected flexible to the reference structure by the use of a rod (13) connected in each end through a ball bearing connection integral with the rod (13). The seat of the ball bearing may be formed directly into the support structure and reference structure, or it may be a dedicated part (14) adapted to any of the two structures.

I claim:

1. A wind turbine comprising:
    a reference structure,
    a rotor having a rotor hub and one or more rotor blades,
    a rotor shaft connected to the rotor hub,
    a generator, and
    a gearbox comprising an input shaft adapted to be operatively connected to the rotor shaft,
    an input gear wheel having teeth arranged around an inner circumference of the input gear wheel, and being attached to the input shaft such as to rotate with the input shaft, wherein the input gear wheel is an annulus gear wheel,
    one or more pinions, each of the one or more pinions including a pinion gear wheel arranged on a pinion shaft, the pinion gear wheel having teeth arranged to engage with the teeth of the input gear wheel, and the pinion shaft being rotatably mounted in a pinion support structure,
    wherein the input shaft is rotatably mounted with respect to the pinion support structure,
    wherein the pinion support structure is flexibly mounted with respect to the reference structure,
    wherein the pinion shaft is connected directly to the generator,
    wherein the gearbox has two or more degrees of freedom in a connection between the pinion support structure and the reference structure, and
    wherein the rotor shaft is rotatably mounted with respect to the reference structure, wherein the reference structure is a frame or housing of the gearbox or a nacelle.

2. The wind turbine according to claim 1, wherein the pinion support structure rotatably supports the input shaft and the one or more pinion shafts.

3. The wind turbine of claim 1, wherein the pinion support structure is rotatably mounted with a first bearing to the input shaft and allowing the pinion gear wheel to rotate.

4. The wind turbine of claim 1, wherein the input shaft and the pinion support structure is rotatably mounted via a first bearing.

5. The wind turbine of claim 1, wherein the input shaft is fixed by the reference structure and allowed to rotate via two second bearings.

6. The wind turbine of claim 1, wherein the pinion gear wheels have involute teeth.

7. The wind turbine of claim 1, wherein the number of the pinion gear wheels is at least two.

8. The wind turbine of claim 3, wherein the first bearing is a rolling bearing, a friction bearing or a ball bearing.

9. The wind turbine of claim 1, wherein the reference structure is a frame or housing of the gearbox or a nacelle or both, wherein the reference structure may be composed of one or more parts.

10. The wind turbine of claim 1, wherein the generator is fixed to the reference structure.

* * * * *